(12) United States Patent
Mair et al.

(10) Patent No.: US 9,233,602 B2
(45) Date of Patent: Jan. 12, 2016

(54) DRIVE UNIT AND VEHICLE AXLE FOR AN ELECTRIC VEHICLE

(75) Inventors: Ulrich Mair, Friedrichshafen (DE); Stephan Pollmeyer, Friedrichshafen (DE); Martin Munster, Munchen-Laim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 11 days.

(21) Appl. No.: 14/233,476

(22) PCT Filed: Jun. 27, 2012

(86) PCT No.: PCT/EP2012/062402
§ 371 (c)(1),
(2), (4) Date: Jan. 17, 2014

(87) PCT Pub. No.: WO2013/013921
PCT Pub. Date: Jan. 31, 2013

(65) Prior Publication Data
US 2014/0166378 A1    Jun. 19, 2014

(30) Foreign Application Priority Data

Jul. 28, 2011   (DE) .......................... 10 2011 080 038

(51) Int. Cl.
*B60K 1/00* (2006.01)
*B60K 7/00* (2006.01)
(Continued)

(52) U.S. Cl.
CPC ................ *B60K 1/00* (2013.01); *B60K 7/0007* (2013.01); *B60K 17/046* (2013.01); *H02K 7/116* (2013.01);
(Continued)

(58) Field of Classification Search
CPC ............ B60K 6/48; B60K 1/00; B60K 6/365; B60L 11/00; B60L 11/18
See application file for complete search history.

(56) References Cited

U.S. PATENT DOCUMENTS 5,381,090 A * 1/1995 Adler et al. ................... 324/174
6,592,486 B1 7/2003 Arbannas et al.
(Continued)

FOREIGN PATENT DOCUMENTS

DE   295 18 401 U1   4/1997
DE   196 17 165 A1   10/1997
(Continued)

OTHER PUBLICATIONS

Heise Autos: Fraunhofer-Forscher verwandeln Audi TT zum Hybridfahrzeug, Kompakte Hybridtechnik lasst sich auch bei beengten Platzverhaltnissen unterbringen.
(Continued)

*Primary Examiner* — Brodie Follman
*Assistant Examiner* — Hilary L Johns
(74) *Attorney, Agent, or Firm* — Davis & Bujold, P.L.L.C.; Michael J. Bujold

(57) ABSTRACT

A drive unit, for an electric vehicle, comprising an electric machine that can be arranged in the area of an end of a vehicle axle of the electric vehicle and also a transmission unit, which co-operates with the electric machine, for driving a wheel of the electric vehicle. The electric machine and the transmission unit can be arranged adjacent to the wheel. The electric machine is designed so that the electric machine can be arranged adjacent to a wheel at either of the two ends of the vehicle axle in the drive unit for driving the wheel concerned. The invention also concerns a vehicle axle incorporating the drive unit.

19 Claims, 5 Drawing Sheets

(51) Int. Cl.
  *B60K 17/04*   (2006.01)
  *H02K 7/116*   (2006.01)
  *B30B 15/30*   (2006.01)
  *A63C 9/00*    (2012.01)
  *A63C 9/085*   (2012.01)
  *A63C 7/10*    (2006.01)

(52) U.S. Cl.
  CPC ............. *A63C 7/1013* (2013.01); *A63C 9/00* (2013.01); *A63C 9/001* (2013.01); *A63C 9/003* (2013.01); *A63C 9/005* (2013.01); *A63C 9/085* (2013.01); *B30B 15/308* (2013.01); *B60K 2001/006* (2013.01); *B60K 2007/0038* (2013.01); *B60K 2007/0061* (2013.01); *B60K 2007/0092* (2013.01); *B60L 2220/42* (2013.01); *B60L 2220/46* (2013.01); *Y02T 10/641* (2013.01)

(56) References Cited

U.S. PATENT DOCUMENTS

| | | |
|---|---|---|
| 2006/0180366 A1 | 8/2006 | Brill et al. |
| 2008/0257088 A1 | 10/2008 | Tesar |
| 2011/0094807 A1 | 4/2011 | Pruitt et al. |
| 2011/0130238 A1* | 6/2011 | Schoon .......... 475/154 |
| 2012/0103708 A1 | 5/2012 | Hennings et al. |

FOREIGN PATENT DOCUMENTS

| | | |
|---|---|---|
| DE | 102 14 878 A1 | 10/2003 |
| DE | 10 2008 036 560 A1 | 2/2010 |
| DE | 10 2009 033 531 A1 | 1/2011 |
| DE | 102009033531 A1 * | 1/2011 |
| EP | 2 329 983 A1 | 6/2011 |
| GB | 332 297 | 7/1930 |

OTHER PUBLICATIONS

German Search Report Corresponding to 10 2011 080 038.7 mailed May 15, 2012.

International Search Report Corresponding to PCT/EP2012/062402 mailed Feb. 6, 2013.

Written Opinion Corresponding to PCT/EP2012/062402 mailed Feb. 6, 2013.

* cited by examiner

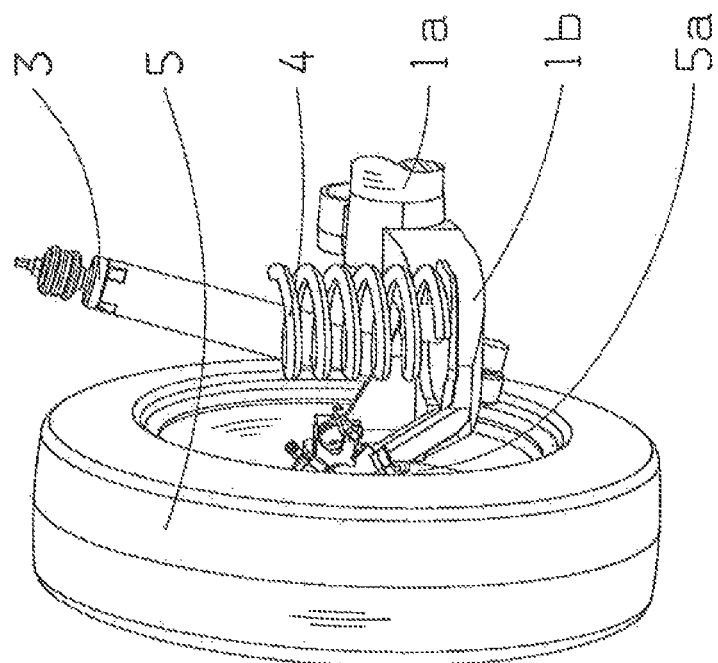
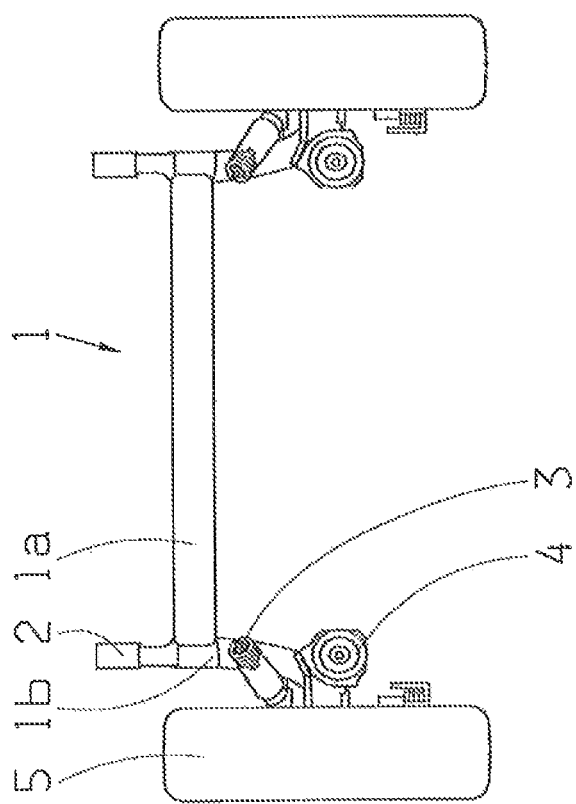
Fig. 1a
Fig. 1b

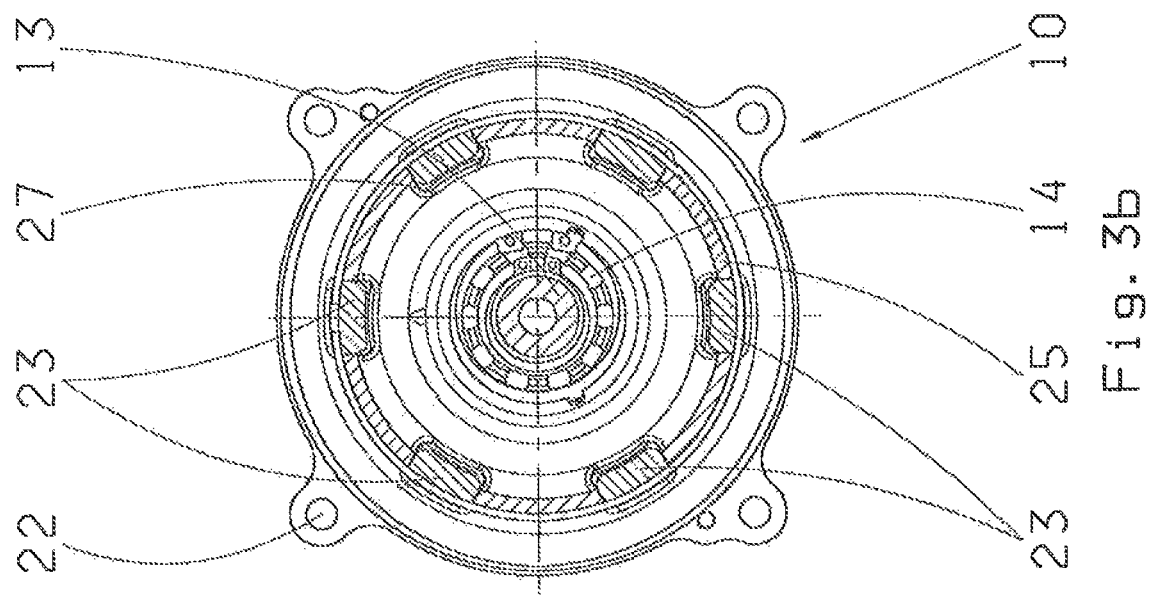
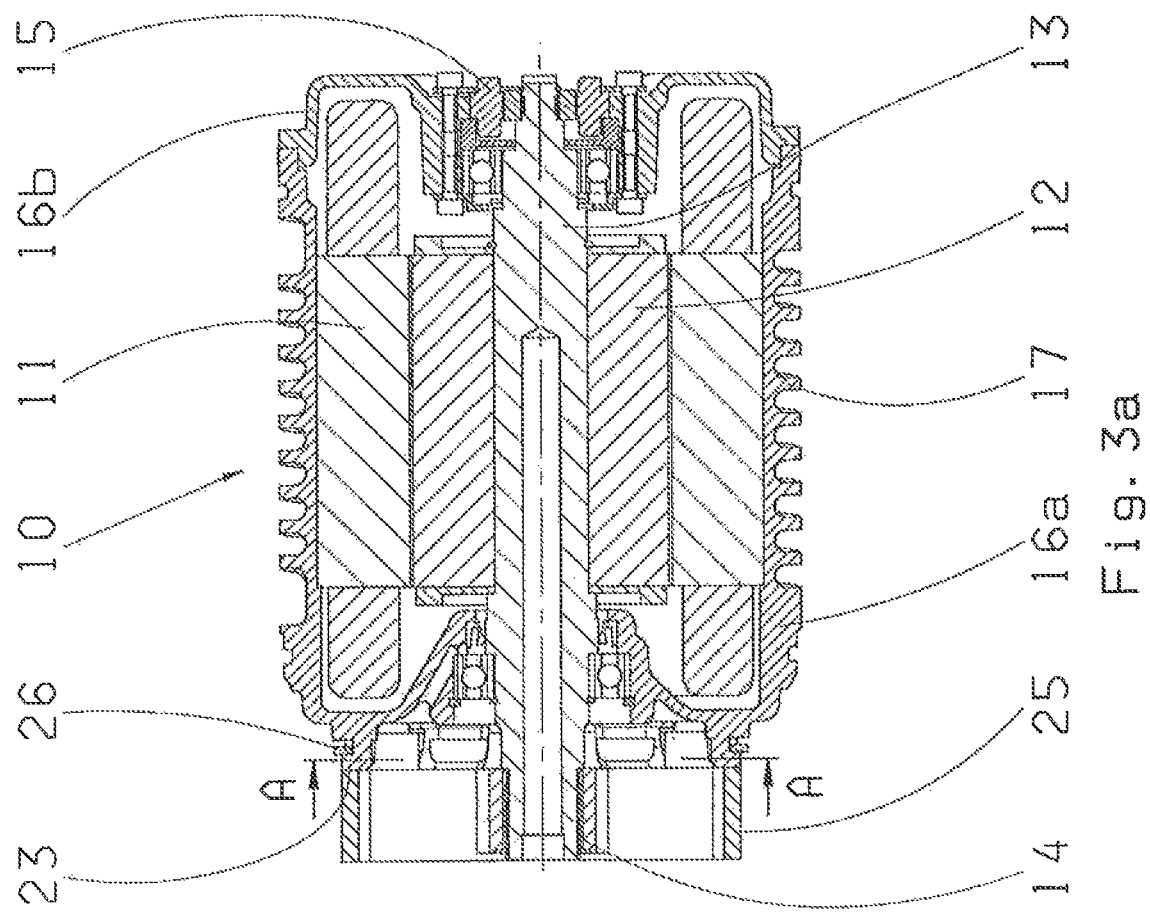

DRIVE UNIT AND VEHICLE AXLE FOR AN ELECTRIC VEHICLE

This application is a national stage completion of PCT/EP2012/062402 filed Jun. 27, 2012 which claims priority from German Application Serial No. 10 2011 080 038.7 filed Jul. 28, 2011.

FIELD OF THE INVENTION

The invention concerns a drive unit for an electric vehicle comprising an electric machine, in particular an electric motor that can be arranged in an area at an end of a vehicle axle of the electric vehicle, and also a transmission unit which co-operates with the electric motor in order to drive an adjacent wheel of the electric vehicle.

The invention also concerns a vehicle axle for an electric vehicle comprising, in each case, a drive unit at opposite ends of the vehicle axle for the respective wheel-adjacent driving of a wheel.

BACKGROUND FIELD OF THE INVENTION

Electric vehicles are understood to be vehicles operated by electrical energy. Electric vehicles include electric automobiles, in particular, which in recent years have increasingly gained attention because of their possible reduction of traffic-originating $CO_2$ emissions and a desired reduction of dependence on petroleum as the basis of gasoline, diesel fuel, etc.

Instead of the internal combustion engine used in conventional vehicles, an electric motor, whose electrical energy is supplied by, for example, accumulators carried in the electric vehicle, is used in electric vehicles.

Wheel-hub electric motors can be used, as the electric motor, for driving an electric automobile. In that case, the wheel-hub electric motor is built directly into a wheel of the electric automobile and, at the same time, supports the wheel hub so that part of the wheel-hub electric motor rotates together with the wheel as an external rotor.

However, wheel-hub electric motors have the disadvantage that the chassis of the electric automobile reacts less comfortably, since the use of wheel-hub motors increases the unsprung masses of the electric vehicle. Moreover, wheel-hub motors are directly exposed to environmental influences, impact loads and the possibly high temperatures of the brakes, which reduce their useful life and their reliability.

SUMMARY OF THE INVENTION

Thus, an objective of the present invention is to provide a drive unit and a vehicle axle which, on the one hand, reduces unsprung masses and, at the same time, can be produced extremely inexpensively. This simplifies its maintenance.

With a drive unit for an electric vehicle comprising an electric machine, in particular an electric motor that can be arranged in an area at an end of a vehicle axle of the electric vehicle, and also a transmission unit which co-operates with the electric machine in order to drive an adjacent wheel of the electric vehicle, the said objective is achieved if the electric machine and the transmission unit can be arranged, adjacent to the wheel, and the electric machine is designed such that it can be arranged in the drive unit, adjacent to the wheel, at either of the two ends of the vehicle axle in order to drive the wheel concerned.

The invention also achieves the objective by virtue of a vehicle axle comprising in each case a drive unit on respective opposite parts of the vehicle axle for the wheel-adjacent driving of a wheel.

Thus, the drive unit can be used both on the left and/or the right side and also on a front or a rear axle for driving a front wheel or rear wheel. In this way, the production costs for a drive unit can be substantially reduced since no design changes of the drive unit are needed, in particular for its arrangement on the left or the right side of the vehicle and for its wheel-adjacent arrangement on a front or rear axle. In all, therefore, a total of four identical electric machines are used with a four-wheel electric vehicle. Furthermore, by virtue of the wheel-adjacent arrangement, for example on a rear axle of the electric vehicle, the unsprung masses as a whole are reduced since the drive unit is not used in the wheel itself, i.e., as a wheel-hub motor. If the drive unit is arranged adjacent to the wheel, on a trailing arm of a torsion beam axle, the drive unit does not undergo the complete stroke of a jouncing movement of the wheel but, in essence, only a pivoting movement about a connection point of the torsion beam axle to the body of the electric vehicle.

Expediently, the electric machine and in particular its housing is made symmetrical. This ensures that the electric machine and the drive unit can be particularly simply exchanged. At the same time, the drive unit can be simply fixed to a vehicle axle since a symmetrical housing structure simplifies the fixing of the drive units for a mechanic. Likewise, during robot-assisted assembly a substantial time saving is possible since the drive unit does not first have to be turned to a predetermined position; thanks to its symmetrical structure the drive unit can be fixed on the vehicle axle in several positions without restricting its function.

Advantageously, the electric machine has fixing means which are arranged symmetrically, in particular radially symmetrically, relative to a respective drive axis of the electric machine. This enables reliable fixing of the electric machine even more simply by means of the fixing means onto a vehicle axle in the area near the wheel.

Expediently, at least one coolant inlet and a coolant outlet are provided for cooling the electric machine, these being arranged symmetrically relative to the fixing means and/or a distance away from one another and one behind the other parallel to a drive axis of the electric machine. This ensures easy accessibility for the connection of hoses for the coolant circuit for cooling the electric machine, in particular the electric motor. Moreover, if the coolant inlet and coolant outlet are a spaced apart, maintenance is further simplified.

Advantageously, the electric machine has a holding device for fixing at least one transmission component, in particular a planetary gear system of the transmission unit. The advantage achieved thereby is that it enables reliable fixing of the transmission unit to the electric machine and so also a more simple fixing of the drive unit onto a vehicle axle.

Expediently, the holding device comprises at least one holding projection which is in particular U-shaped. In particular, the open side of the U-shaped holding projection can be orientated, in the radial direction, starting from a drive axis of the electric machine. Likewise, a plurality of holding projections can be arranged peripherally around the drive axis of the electric machine and spaced apart. The U-shaped design enables a particularly simple positioning of a transmission unit on the electric machine by means of the holding device.

Advantageously, the transmission unit comprises a planetary gear system with a ring gear, wherein the ring gear can be fixed to the holding device, in the axial direction, onto the electric machine. In this way, a transmission unit with a planetary gear system can be driven by means of a sun shaft which, in particular, corresponds to the drive axis of the electric machine, and the drive output takes place via a web of the satellite gear system; in this case, the ring gear is arranged in a rotationally fixed manner on the holding device so enabling a reliable transmission of the drive torque of the electric machine by way of the planetary gear system, for example to a spur gear stage as a further transmission component of the transmission unit.

Expediently, the ring gear is attached to the holding device, in particular rotationally fixed thereto, by means of a locking ring. The advantage of this is that it enables a soft coupling of the ring gear to the electric machine and thus an acoustic decoupling of the ring gear from the surroundings. It is then also possible to attach the drive unit, on a vehicle axle, and to fix the ring gear by means of further fastening means to a trailing arm of the vehicle axle.

Advantageously, the ring gear has at least one axial and/or radial all-round groove. By means of an axial groove, which preferably corresponds with the holding device of the electric machine, the ring gear can be brought into engagement with and fixed to the electric machine. This ensures a firm connection and rotationally fixed arrangement in the circumferential direction of the ring gear. If the ring gear has a radial all-round groove, a locking ring can be fitted into this groove so that the locking ring engages both in the radial all-round groove and also in the U-shaped holding projections, thereby fixing the ring gear on the electric motor in the axial direction.

Expediently, a rotation speed sensor is designed as an ABS sensor for the speed of either the transmission unit and/or the electric machine. The advantage of this is that the ABS sensor does not have to be arranged directly on the wheels themselves, where it would be exposed to weathering influences, but instead the ABS sensor can be arranged directly in the transmission unit so increasing the reliability of the ABS sensor. At the same time, there is no need for an additional ABS sensor, besides a rotation speed sensor for the electric machine, which reduces manufacturing costs for the transmission unit.

Advantageously, a ring magnet is arranged on the shaft of the transmission unit so that the rotation speed of the shaft can be detected by the ABS sensor. This has the advantage of enabling the speed of the shaft to be detected with very little wear, which increases the reliability of the ABS sensor. Moreover, the ABS sensor can also detect the rotation speed of the shaft either radially or axially by virtue of the teeth of gearwheels of the transmission unit. Likewise, the sensor can be arranged on any drive input gearwheel, in particular, a spur gear and/or pinion and/or web and/or planetary shaft and/or sun shaft.

Expediently, the ring gear is made of steel and/or the housing of the electric machine is made of aluminum. If the housing of the electric machine is made of aluminum heat can be effectively dissipated by way of the outer surface of the housing of the electric machine. In that case, the outer surface of the housing of the electric machine can be provided with a spiral all-round groove for cooling. Making the ring gear of steel ensures that the connection between the transmission unit and the electric machine is sufficiently strong.

Other important characteristics and advantages of the invention emerge from the drawings and the associated figure descriptions that refer to the drawings.

It is understood that the characteristics mentioned above and those still to be explained below can be used not only in the combination indicated in each case, but also in other combinations or in isolation, without going outside the scope of the present invention.

Preferred example embodiments of the invention are illustrated in the drawings and are explained in more detail in the description that follows, wherein the same indexes are used for the same, or similar, or functionally equivalent components or elements.

BRIEF DESCRIPTION OF THE DRAWINGS

The figures show, in each case schematically:

FIG. 1a: A structure of a vehicle axle of a vehicle;

FIG. 1b: The left-hand area of the vehicle axle in FIG. 1, shown in a detailed three-dimensional view;

FIG. 2b: A three dimensional view of an electric motor in FIG. 2a;

FIG. 3a: An electric motor of a drive unit with a ring gear attached, as in FIG. 2c;

FIG. 3b: An electric motor, as in FIG. 3a, viewed along the direction of the drive axis of the electric motor.

DETAILED DESCRIPTION OF THE PREFERRED EMBODIMENTS

Figure 2A:
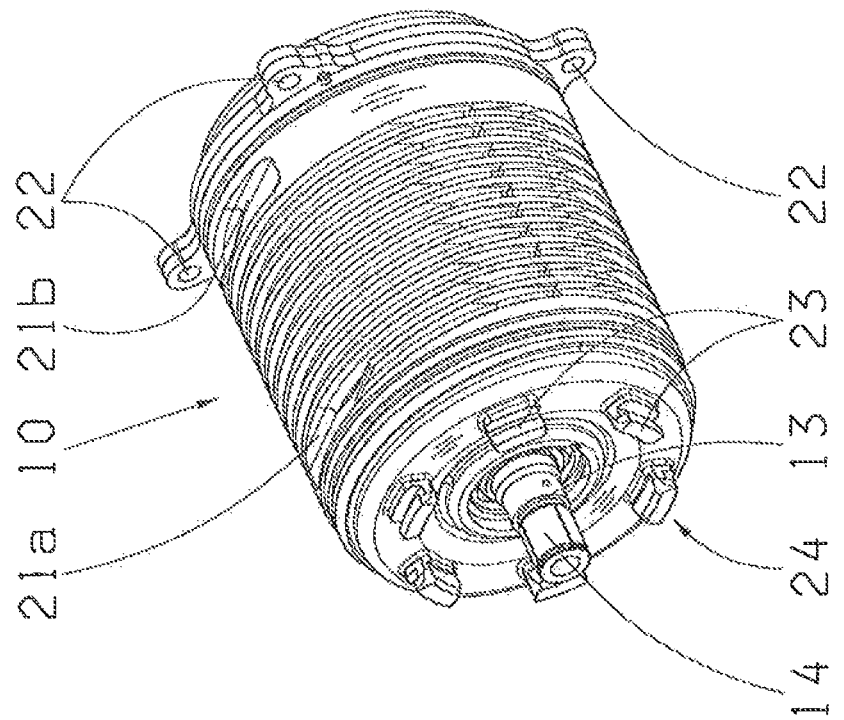
FIG. 2a: An electric motor of a drive unit, shown in cross-section, according to a first embodiment of the present invention.

FIG. 1a shows a structure of a vehicle axle of a vehicle.

In FIG. 1a, indexed 1 is a vehicle axle, for example a rear axle of a motor vehicle. The vehicle axle 1 has a transverse profile 1a that extends over the width of the vehicle, perpendicularly to the vehicle axle 1. Trailing arms 1b are arranged at each end of the transverse profile 1a. Corresponding mountings 2 are arranged, at the ends of the transverse profile 1a, to attach the vehicle axle 1 to the vehicle. In addition, a damper 3 and a spring 4 are provided which enable a wheel 5 of the vehicle to be damped during the operation of the vehicle. In this case, a drive unit is arranged adjacent to the wheel, for example, in the area of the trailing arm 1b, designed in particular as the trailing arm 1b.

FIG. 1b shows, in detail, the three-dimensional structure of the left-hand side of the vehicle axle 1 in FIG. 1a. On the transverse profile 1a, the trailing arm 1b is arranged on which, in turn, are arranged a damper 3 and a spring 4, both connected to the body of the vehicle. The wheel 5 is connected to the trailing arm 1b and is mounted to rotate by means of a wheel bearing 5a.

FIG. 2a shows an electric motor of a drive unit, shown in cross-section, according to a first embodiment of the present invention.

In FIG. 2a, indexed 10 is an electric motor for a wheel-adjacent drive unit. The electric motor 10 comprises a drive spindle 13, at the open end, on which drive teeth 14, for example a sun gear of a planetary gear system, are arranged. On the side of the drive spindle 13, opposite to the drive teeth 14, a rotation speed sensor 15 is arranged to detect the rotation speed of the electric motor 10. As a whole, in the normal manner, the electric motor 10 comprises a stator 11 inside the housing 16a of the electric motor 10 and a rotor 12 inside the stator 11 for driving the drive spindle 13. The housing 16a of the electric motor 10 is closed in an airtight and fluid-tight manner by a cover 16b, on the side where the speed sensor 15 is located. On the outer side of the housing 16a, in the area of the stator, all-round cooling fins 17 are arranged in order to dissipate, as effectively as possible, the heat of the electric motor 10 into the surroundings.

Figure 2B:
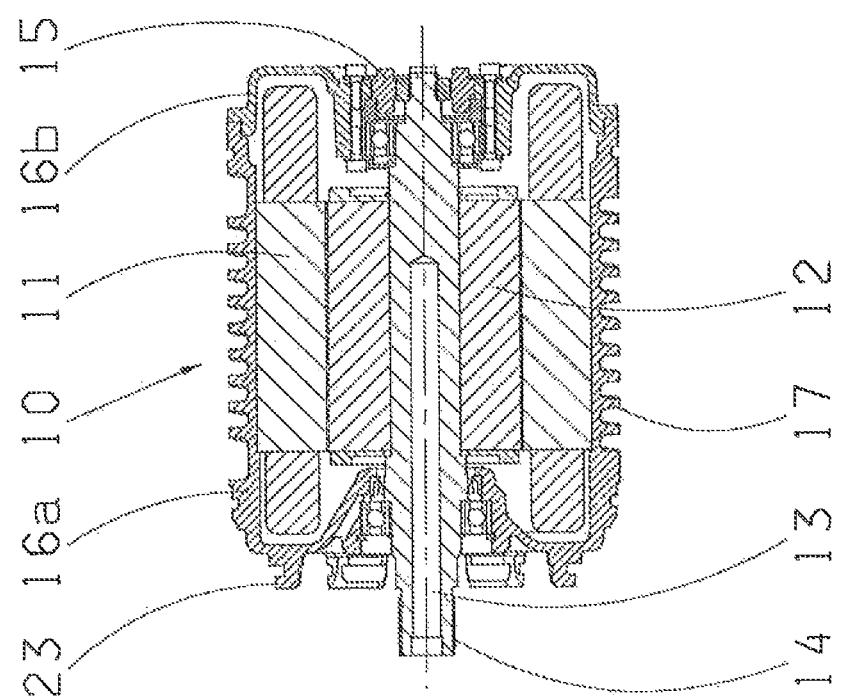

FIG. 2b shows a three-dimensional view of the electric motor as in FIG. 2a.

FIG. 2b shows the electric motor 10 according to FIG. 2a. In this case, as also in FIG. 2a, the electric motor 10 is designed symmetrically and in cartridge form so that the electric motor 10, for repair purposes, can be exchanged easily without having to dismantle completely a transmission unit. At the drive-teeth end 14, the holding end 24, the electric motor has holding projections 23 which are U-shaped with their openings facing outward from the drive spindle 13 in the radial direction. In addition, projecting fixing eyes 22 are provided, around the area of the opposite end, which are positioned to enable the electric motor 10 to be bolted onto a transmission unit and/or onto a vehicle axle. As shown in FIG. 2b, on the upper side a coolant inlet 21a and a coolant outlet 21b are provided, which are a spaced apart from one another, in the axial direction, and which serve to carry coolant to and from a cooling circuit of the electric motor.

Figure 2D:
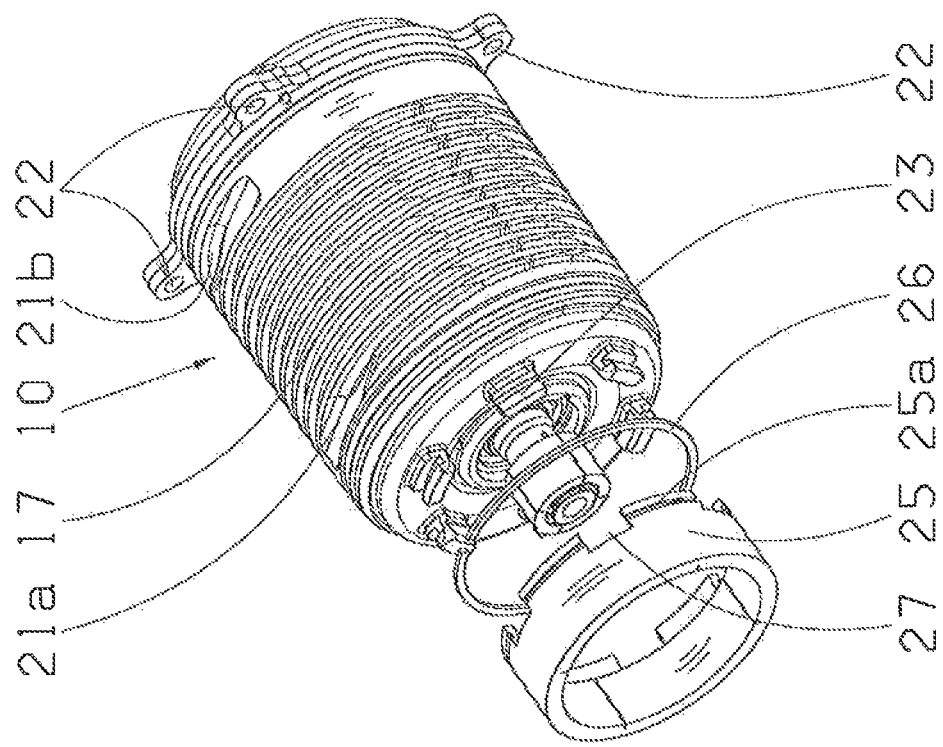
FIG. 2d: An electric motor, as in FIG. 2a, with a ring gear to be attached.
Figure 2C:
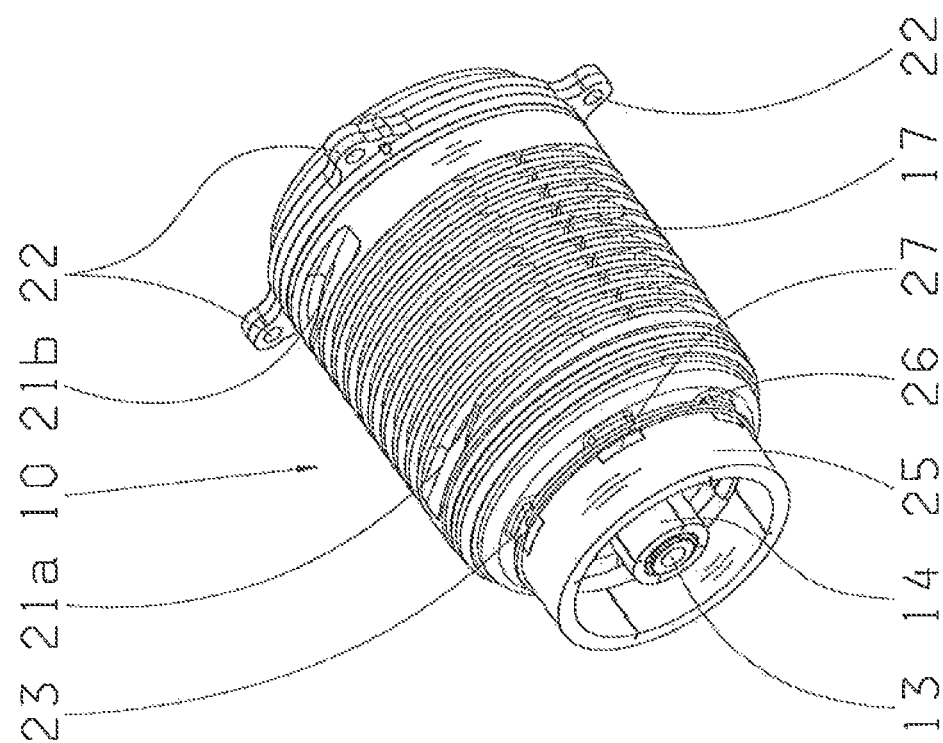
FIG. 2c: An electric motor, as in FIG. 2a, with a ring gear.

FIG. 2c now shows a ring gear 25 arranged at the end of the electric motor 10, on the holding projections 23. The ring gear 25 has grooves 27, distributed around its circumference, which correspond with the holding projections 23, on the holding side 24 of the electric motor 10. As shown in FIGS. 2c and 2d, the ring gear 25 is pushed into the respective axial grooves 27 in the holding projections 23. An all-round groove 25a, arranged on the ring gear, is formed in such manner that when the ring gear is in interlocked contact with the grooves 27 in the corresponding holding projections 23 of the electric motor 10, in particular by virtue of the U-shape of the holding projections 23 and the circumferential groove 25a, interrupted by the grooves 27, an all-round recess is formed. A locking ring 26, which then fixes the ring gear 25 to the electric motor 10 in the axial direction, is fitted into the said recess. When the grooves 27 of the ring gear 25 are engaged with the holding projections 23, the ring gear 25 is also attached to the electric motor 10 in a rotationally fixed manner.

FIG. 3a shows an electric motor of a drive unit with a ring gear fixed in place in accordance with FIG. 2c.

FIG. 3a shows the electric motor 10 with the ring gear 25 fitted on it, as in FIG. 2c, viewed in cross-section. The ring gear 25 is attached, in a rotationally fixed manner, by the engagement of the grooves 27 in the holding projections 23 and is axially fixed by means of the locking ring 26. This is again made clear by FIG. 3b, which shows a section along the section axis A-A in FIG. 3a. The holding projections 23, in which the grooves 27 of the ring gear 25 engage, can be seen clearly. Visible on the inside is the drive spindle 13 of the electric motor 10, which has drive teeth 14 in the area of the ring gear.

Figure 4:
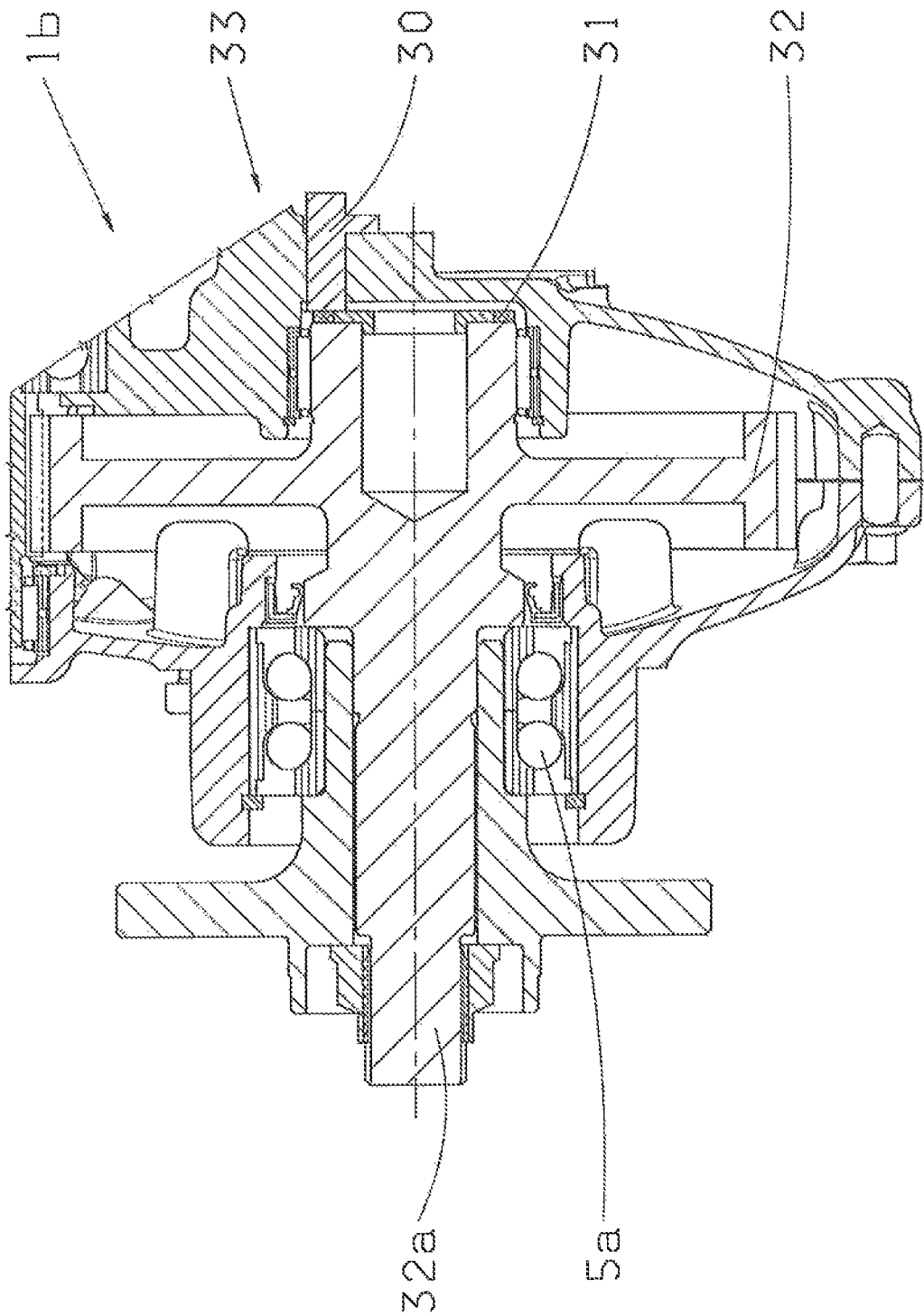
FIG. 4: A cross-section through a transmission unit of a drive unit, according to a second embodiment of the present invention.

FIG. 4 shows a cross-section through a transmission unit of a drive unit, according to a second embodiment of the present invention.

FIG. 4 shows a transmission unit 33 for the wheel-adjacent driving of an electric vehicle, which is arranged essentially in the area of the trailing arm 1b of a vehicle axle. A spur gear 32 of a pinion-spur gear arrangement is also visible. A spur shaft is indirectly connected to an electric motor 10 in order to drive a wheel (not shown). On the side of the spur gear 32, opposite to the wheel bearing 5a, a ring magnet 31 is arranged on the drive spindle 32a. An ABS sensor 30 is positioned, in the area of the ring magnet 31, in order to determine the rotation speed of the drive spindle 32a. Besides this, further ABS sensors can also be arranged on other drive gearwheels or their shafts, in particular a spur gear shaft, pinion shaft, web shaft, planetary shaft or sun shaft. The ABS sensor 30 can determine radially or axially a rotation speed of the shaft concerned by way of the spline teeth of the gearwheel.

In summary, among other things, the invention has the advantages that in a simple and reliable manner a ring gear can be coupled to an electric machine so that the ring gear is acoustically decoupled from the surroundings. Furthermore the drive unit can be made conveniently since it can be fitted on both the front and the rear axle and on the left and/or the right side, without any additional design measures for the wheel-adjacent driving of a wheel of an electric vehicle. By means of the holding projections and corresponding grooves, the ring gear can indeed be very reliably attached rotationally fixed to the electric motor. Moreover there is no need for an additional ABS sensor on a wheel of the motor vehicle, and the ABS sensor is integrated in the transmission unit of the drive unit, so reducing production costs and increasing the reliability of the ABS sensor.

Although the present invention has been described above with reference to preferred example embodiments, it is not limited to these but can be modified in many ways.

INDEXES

1 Vehicle axle
1a Transverse profile
1b Trailing arm
2 Mounting
3 Damper
4 Spring
5 Wheel
5a Wheel bearing
10 Electric motor
11 Stator
12 Rotor
13 Drive spindle
14 Drive teeth
15 Rotation speed sensor
16a Housing of the electric motor
16b Cover
17 Cooling fin
21a Coolant inlet
21b Coolant outlet
22 Fixing eye
23 Holding projection
24 Holding side
25 Ring gear
25a All-round groove
26 Locking ring
27 Groove
30 ABS sensor
31 Ring magnet
32 Spur gear
32a Drive spindle
33 Drive unit

The invention claimed is:

1. A drive unit (10, 33) for an electric vehicle, the drive unit (10, 33) comprising:
at least one electric machine (10), the electric machine being arranged in an area of one of two opposed axial ends of a vehicle axle (1) of the electric vehicle;
a housing enclosing only one of the at least one electric machine, the housing comprises a plurality of holding projections that are arranged about a circumference of the housing and extend axially from an end of the housing;

a transmission unit (33) cooperating with the electric machine (10) for driving a respective wheel (5) of the electric vehicle, the transmission unit having at least one transmission component, the transmission component comprises an end having a plurality of grooves that are arranged about a circumference of the transmission component;

the electric machine (10) and the transmission unit (33) are arranged adjacent to the wheel at the one of the two opposed axial ends of the vehicle axle, the electric machine (10) is arranged, adjacent to the wheel at the one of the two opposed axial ends of the vehicle axle (1), in the drive unit for driving the wheel (5) concerned; and the plurality of holding projections of the housing are received by the plurality of grooves of the transmission component and facilitate coupling of the housing and the transmission component.

2. The drive unit (10, 33) according to claim 1, wherein the electric machine (10) and the housing thereof are symmetrically arranged relative to a drive axis of the electric machine.

3. The drive unit (10, 33) according to claim 1, wherein the housing of the electric machine (10) has fixing means (22) which is arranged symmetrically relative to a respective drive spindle (13) of the electric machine (10).

4. The drive unit (10, 33) according to claim 3, wherein the housing of the electric machine has axially opposed first and second ends, at least one coolant inlet (21a) is located at the first end of the housing and at least one coolant outlet (21b) is located at the second end of the housing and facilitate a flow of coolant for cooling the electric machine (10), the at least one coolant inlet (21a) and the at least one coolant outlet (21b) are arranged one of symmetrically relative to the fixing means (22) and spaced apart from each other along an axis that is parallel to a drive spindle (13) of the electric machine (10).

5. The drive unit (10, 33) according to claim 1, wherein the housing of the electric machine (10) has fixing eyes (22) which are arranged radially symmetrically relative to a respective drive spindle (13) of the electric machine (10).

6. The drive unit (10, 33) according to claim 1, wherein the plurality of grooves of the transmission component mate with the plurality of holding projections to rotationally fix the electric machine (10) and the transmission component to each other.

7. The drive unit (10, 33) according to claim 6, wherein the plurality of holding projections of the housing each comprise a radially outwardly facing recess which align with a circumferential channel in the transmission component when the plurality of holding projections of the housing are received by the plurality of grooves of the transmission component, and an annular ring is received by the circumferential channel and the outwardly facing recesses of the holding projections to lock the transmission component to the housing.

8. The drive unit (10, 33) according to claim 1, wherein the plurality of the holding projections and the plurality of grooves fix the electric machine (10) to a planetary gear system of the transmission unit (33).

9. The drive unit (10, 33) according to claim 1, wherein the transmission unit (33) comprises a planetary gear system and the transmission component is a ring gear (25) so that the ring gear (25) is attached, in an axial direction, to the electric machine (10).

10. The drive unit (10, 33) according to claim 9, wherein the ring gear (25) is attached, in a rotationally fixed manner, to the holding device (23) by a locking ring (26) which fixes the plurality of holding projections of the housing to the ring gear.

11. The drive unit (10, 33) according to claim 9, wherein the ring gear (25) is cylindrical and the plurality of grooves are axial grooves, and the ring gear has an annular channel (27), the annular channel of the ring gear receives a locking ring which is also received by recesses in the plurality of holding projections so as to lock the ring gear to the housing of the electric machine.

12. The drive unit (10, 33) according to claim 9, wherein at least one of the ring gear (25) is made of steel and the housing of the electric machine (10) is made of aluminum.

13. The drive unit (10, 33) according to claim 1, wherein a rotation speed sensor (15, 30), for detecting at least one of a rotation speed of a shaft of the transmission unit (33) and a rotation speed of a shaft of the electric machine (10), is designed in the form of an ABS sensor (30).

14. The drive unit (10, 33) according to claim 13, wherein a ring magnet (31) is arranged on the shaft of the transmission unit (33) for detecting the rotation speed thereof by the ABS sensor (30).

15. The drive unit (10, 33) according to claim 1, wherein the vehicle axle (1) has first and second opposed axial ends,
a first drive unit (10, 33) is supported adjacent the first axial end, of the vehicle axle (1) for wheel-adjacent driving of a first wheel,
a second drive unit (10, 33) is supported adjacent the second axial end of the vehicle axle (1) for wheel-adjacent driving of a second wheel, and the first drive unit has a first housing which encloses a first electric machine, and the second drive unit has a housing which encloses a first electric machine such that the first and the second drive units are axially spaced from each other.

16. A vehicle axle (1) comprising first and second opposed ends, a first drive unit (10, 33) being supported adjacent the first end of the vehicle axle (1) for wheel-adjacent driving of a first wheel, and a second drive unit (10, 33) being supported adjacent the second end of the vehicle axle (1) for wheel-adjacent driving of a second wheel, and each of the first and the second drive units (10, 33) comprising:
a respective electric machine (10) being arranged in an area of one end of the vehicle axle (1), each of the electric machines being enclosed in a respective housing, one axial end of each of the housings comprises a plurality of axially extending holding projections that are arranged about a circumference of the housing; and
a respective transmission unit (33) cooperating with the respective electric machine (10) for driving the respective wheel (5), each of the transmission units having an axial end that comprises a plurality of axially extending grooves, the axially extending holding projections of the housings are received within the plurality of axially extending grooves of the transmission units to fix the transmission units to the respective electric machines;
wherein the respective electric machine (10) and the respective transmission unit (33) are arranged adjacent to the respective wheel at the respective first and the second ends of the vehicle axle (1).

17. The drive unit according to claim 16, wherein the plurality of the holding projections of the housings being radially symmetrically spaced from each other about a circumference of the respective housing relative to a drive axis of the respective electric machine, the plurality of the grooves of the transmission units are radially symmetrically spaced from each other about a circumference of the respective transmission unit.

18. The drive unit according to claim 17, wherein the holding projections of the respective housings engage the axially extending grooves of the transmission units to rotationally fix the respective transmission unit to the housing of the respective electric machine.

19. The drive unit according to claim 18, wherein the transmission units are ring gears and each of the ring gears comprises an annular groove and each of the holding projections of the housings comprises a radially outward facing channel, the radially outward facing channels aligning with the annular groove when the holding projections of the housings are received within the axially extending grooves of the respective ring gear, a locking ring being received within the annular groove of the respective ring gear and the radially outward facing channels of the holding projections to axially fix the ring gear to the housing of the respective electric machine.

* * * * *